US012620625B2

(12) United States Patent
Qiao et al.

(10) Patent No.: US 12,620,625 B2
(45) Date of Patent: May 5, 2026

(54) ELECTROLYTE SOLUTION FOR LITHIUM-ION BATTERY AND LITHIUM-ION BATTERY

(71) Applicant: BYD COMPANY LIMITED, Shenzhen (CN)

(72) Inventors: Feiyan Qiao, Shenzhen (CN); Ping Lu, Shenzhen (CN); Haijun Wang, Shenzhen (CN); Rong Hao, Shenzhen (CN); Yi Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 707 days.

(21) Appl. No.: 18/069,640

(22) Filed: Dec. 21, 2022

(65) Prior Publication Data

US 2023/0122863 A1 Apr. 20, 2023

Related U.S. Application Data

(63) Continuation of application No. PCT/CN2021/101245, filed on Jun. 21, 2021.

(30) Foreign Application Priority Data

Jun. 23, 2020 (CN) ........................ 202010584645.X

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
CPC ......... H01M 10/0567; H01M 10/0525; H01M 10/0568; H01M 10/0569; H01M 2300/0028
USPC ........................................................ 429/341
See application file for complete search history.

(56) References Cited

U.S. PATENT DOCUMENTS

| | | | | |
|---|---|---|---|---|
| 2012/0077076 | A1 | 3/2012 | Cheng et al. | |
| 2016/0359199 | A1 * | 12/2016 | Galiano ............ | H01M 10/0567 |
| 2020/0099092 | A1 * | 3/2020 | Kohyama ............. | H01M 4/133 |
| 2022/0045321 | A1 * | 2/2022 | Matsumoto ........... | H01M 4/131 |

FOREIGN PATENT DOCUMENTS

| | | | | | |
|---|---|---|---|---|---|
| CN | 103618106 | A | * | 3/2014 | ........ H01M 10/0567 |
| CN | 104241685 | A | * | 12/2014 | ........ H01M 10/0567 |
| CN | 104466249 | A | | 3/2015 | |
| CN | 106104895 | A | | 11/2016 | |
| CN | 107887647 | A | | 4/2018 | |
| CN | 109687022 | A | | 4/2019 | |
| CN | 110518284 | A | | 11/2019 | |
| CN | 110649318 | A | | 1/2020 | |
| CN | 110931861 | A | | 3/2020 | |
| JP | 2005347222 | A | * | 12/2005 | ............ H01M 10/05 |
| JP | 4662600 | B2 | | 3/2011 | |
| JP | 2020047525 | A | | 3/2020 | |
| KR | 20200044539 | A | | 4/2020 | |

OTHER PUBLICATIONS

English translation of Written Opinion for PCT/CN2021/101245. (Year: 2021).*

The World Intellectual Property Organization (WIPO) International Search Report for PCT/CN2021/101245 Sep. 9, 2021 5 pages (with translation).

* cited by examiner

*Primary Examiner* — Patricia L. Hailey
(74) *Attorney, Agent, or Firm* — Wenye Tan

(57) ABSTRACT

The present disclosure relates to an electrolyte solution for a lithium-ion battery. The electrolyte solution includes an organic solvent, a lithium salt, and an additive. The electrolyte solution provided in the present disclosure includes a 6-membered heterocyclyl carboxylic anhydride additive, and can effectively inhibit gas production and the increase of interface impedance in the battery, improve the high-temperature stability of the battery, and prolong the service life of the battery.

12 Claims, No Drawings

ELECTROLYTE SOLUTION FOR LITHIUM-ION BATTERY AND LITHIUM-ION BATTERY

CROSS-REFERENCE TO RELATED APPLICATIONS

This application is a continuation application of PCT application No. PCT/CN2021/101245 filed on Jun. 21, 2021, which claims priority to and benefits of Chinese Patent Application No. 202010584645.X, filed on Jun. 23, 2020. The entire content of all of the above-referenced applications is incorporated herein by reference.

FIELD

The present disclosure relates to the field of lithium-ion batteries, and specifically to an electrolyte solution for a lithium-ion battery and a lithium-ion battery.

BACKGROUND

Lithium-ion batteries with high energy density have always been an indispensable battery system in the battery market. However, during use of such a battery system, gases are produced by parasitic reactions between the interface and the electrolyte solution, and the interface impedance increase, resulting in the expansion of the battery and the shortened service life of the battery. In particular, in the pursuit of batteries with higher energy density in recent years, positive electrode materials suitable for high-voltage applications have been continuously developed, and the research of electrolyte solutions for the materials for high-voltage applications has also become the top priority. The limit voltage of existing electrolyte solution systems is 4.2 V, and a voltage of above 4.2 V causes the electrolyte solution to be oxidized at the positive electrode, which leads to gas production and unduly quick consumption of the electrolyte solution, resulting in safety hazards of the battery and shortening the service life of the battery. Therefore, the research of electrolyte solutions suitable for high-voltage systems is now an urgent priority. A conventional solution is to use a fluorine-containing solvent to increase the oxidative decomposition potential of the electrolyte solution. Although the oxidative decomposition potential of the fluorine-containing solvent is high, the release of HF at a later stage of the electrolyte solution will damage the particles of the positive and negative electrode materials and affect the service life of the battery.

SUMMARY

In order to further increase the oxidative decomposition potential of the electrolyte solution, solve the current problem of electrolyte solution decomposition under high voltage, and improve the high-voltage and high-temperature stability of the lithium-ion battery, the present disclosure provides an electrolyte solution for a lithium-ion battery and a lithium-ion battery.

To achieve the above objectives, a first aspect of the present disclosure provides an electrolyte solution for a lithium-ion battery. The electrolyte solution for a lithium-ion battery includes an organic solvent, a lithium salt, and an additive. The additive includes a first additive represented by formula (1):

formula (1)

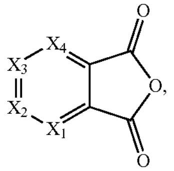

where in the formula (1), $X_1$, $X_2$, $X_3$ and $X_4$ are each independently selected from CR or N, and at least one of $X_1$, $X_2$, $X_3$ or $X_4$ is N; and R in $X_1$, $X_2$, $X_3$ and $X_4$ are each independently selected from H, halogen, $C_1$-$C_4$ alkyl, $C_1$-$C_4$ substituted alkyl, $C_4$-$C_7$ cycloalkyl, or $C_1$-$C_3$ alkoxy.

The inventors of the present disclosure have unexpectedly discovered that the additive represented by formula (1) can preferentially undergo oxidation reaction to form a film at a high-nickel positive electrode interface, and the resulting positive electrode film layer has good ion-conductivity and well prevents the interface deterioration reaction between the positive electrode that promotes oxidation reaction and the electrolyte solution during the cycle and storage processes, thereby preventing or reducing the increased polarization caused by the continuous increase of the film layer at the interface and the expansion caused by gases produced by the reactions at the interface. Thus, the present application is obtained.

A second aspect of the present disclosure provides a lithium-ion battery. The lithium-ion battery includes the electrolyte solution for a lithium-ion battery provided in the first aspect of the present disclosure.

Through the above technical solutions, the present disclosure provides an electrolyte solution for a lithium-ion battery and a lithium-ion battery, and the lithium-ion battery including the electrolyte solution provided in the present disclosure has better high-temperature stability and battery cycle performance at a high voltage.

Other features and advantages of the present disclosure will be described in detail in the following detailed description.

DETAILED DESCRIPTION

Specific implementations of the present disclosure are described in detail below. It should be understood that the specific implementations described herein are merely used to describe and explain the present disclosure, but are not intended to limit the present disclosure.

A first aspect of the present disclosure provides an electrolyte solution for a lithium-ion battery. The electrolyte solution for a lithium-ion battery includes an organic solvent, a lithium salt, and an additive. The additive includes a first additive represented by formula (1):

formula (1)

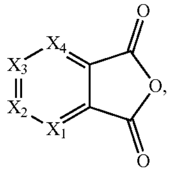

where, $X_1$, $X_2$, $X_3$ and $X_4$ are each independently selected from CR or N, and at least one of $X_1$, $X_2$, $X_3$ or $X_4$ is N; and R in $X_1$, $X_2$, $X_3$ and $X_4$ are each independently selected from H, halogen, $C_1$-$C_4$ alkyl, $C_1$-$C_4$ substituted alkyl, $C_4$-$C_7$ cycloalkyl, or $C_1$-$C_3$ alkoxy.

The electrolyte solution for a lithium-ion battery of the present disclosure includes a 6-membered heterocyclyl carboxylic anhydride additive, and can form a film on the surface of the positive electrode, i.e., form a positive electrode interface film with excellent lithium-ion conductivity, which can block the deterioration reaction of the electrolyte solution on the surface of the positive electrode under high voltage conditions, inhibit the continuous production of gases during the cycle process of the battery, reduce the battery expansion, inhibit the decomposition of the electrolyte solution, and prolong the service life of the battery.

In some embodiments, the 6-membered heterocyclic ring is a 6-membered ring containing one N atom or two N atoms. In some embodiments, a 6-membered ring containing one N atom, because the reaction potential of such molecules is lower and is more conducive to the formation of the film on the surface of the positive electrode by oxidation reaction, and the components forming the film have a good ion conductivity.

According to the present disclosure, a content of the organic solvent, a content of the lithium salt, and a content of the additive in the electrolyte solution for a lithium-ion battery may vary over a large range. In some embodiments, the content of the organic solvent may be 50%-90% by weight, the content of the lithium salt may be 1%-20% by weight, and the content of the additive may be 0.1%-10% by weight. In some embodiments, the content of the organic solvent may be 60%-85% by weight, the content of the lithium salt may be 5%-15% by weight, and the content of the additive may be 0.5%-8% by weight. In the above case, an excellent film layer may be formed on the interfaces of the positive and negative electrodes of the battery, to inhibit the side reactions of the electrolyte solution on the active sites on the interfaces of the positive and negative electrodes, inhibit gas production and the increase of interface impedance in the battery, improve the high-temperature stability of the battery, and prolong the service life of the battery.

According to the present disclosure, in the additive, based on the total weight of the additive, a content of the first additive is 30%-100% by weight. In some other embodiments, the content of the first additive is 50%-100% by weight.

According to the present disclosure, in formula (1), R1 in $X_1$, $X_2$, $X_3$ and $X_4$ is H. In this case, the additive has a smaller molecular weight and a lower oxidative decomposition potential, and can undergo oxidation reaction on the surface of the positive electrode more easily.

In some embodiments, the first additive represented by formula (1) is 2,3-pyridine dicarboxylic anhydride, 3,4-pyridine dicarboxylic anhydride, 2,3-pyrazine dicarboxylic anhydride, or 4,5-pyridazine dicarboxylic anhydride. In this case, the first additive has a low oxidative decomposition or film formation potential, and therefore can form a film on the surface of the positive electrode.

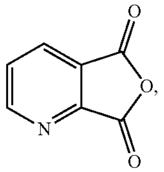, 2,3-pyridine dicarboxylic anhydride

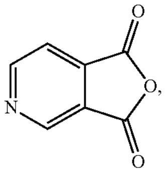, 3,4-pyridine dicarboxylic anhydride

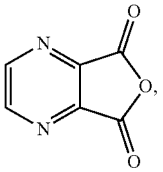, 2,3-pyrazine dicarboxylic anhydride

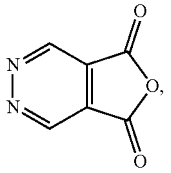, 4,5-pyridazine dicarboxylic anhydride

According to the present disclosure, the lithium salt may be, for example, one or more of $LiPF_6$, $LiBF_4$, $LiClO_4$, $LiAsF_6$, $LiCF_3SO_3$, $LiN(CF_3SO_2)_2$, $LiN(C_2F_5SO_2)_2$, $LiC(CF_3SO_2)_3$, or $LiB(C_2O_4)_2$.

According to the present disclosure, the organic solvent may be, for example, one or more of ethyl methyl carbonate, dimethyl carbonate, diethyl carbonate, ethylene carbonate, propylene carbonate, butylene carbonate, ethylene sulfite, propylene sulfite, diethyl sulfite, γ-butyrolactone, dimethyl sulfoxide, ethyl acetate, or methyl acetate.

According to the present disclosure, based on the total weight of the additive, the additive further includes the balance of a second additive, and the second additive includes one or more of vinyl carbonate, lithium boroxalate, or lithium difluorosulfonimide.

A second aspect of the present disclosure provides a lithium-ion battery. The lithium-ion battery includes a housing, and a battery core and the electrolyte solution for a lithium-ion battery provided in the first aspect of the present disclosure that are accommodated inside the housing.

According to the present disclosure, the battery core may include a positive electrode, a negative electrode, and a separator between the positive electrode and the negative electrode.

According to the present disclosure, the positive electrode may include a positive electrode current collector and a positive electrode material, and the positive electrode material may include a positive electrode active material, a conductive agent, and a positive electrode binder. The positive electrode active material, the conductive agent, and the positive electrode binder may be a positive electrode active material, a conductive agent, and a positive electrode binder conventionally used in the art. The positive electrode active material may be a nickel manganese positive electrode material or lithium iron phosphate positive electrode material of a spinel or layered structure. In some embodiments the positive electrode active material can be spinel $LiNi_{0.5}Mn_{1.5}O_4$.

According to the present disclosure, the negative electrode includes a negative electrode current collector and a negative electrode material, and the negative electrode material includes a negative electrode active material and a negative electrode binder. The negative electrode material may optionally include a conductive agent, which is a conventional conductive agent and may be the same as or different from the conductive agent in the positive electrode material layer. The negative electrode active material and the negative electrode binder may be a negative electrode active material and a negative electrode binder conventionally used in the art. The negative electrode active material is lithium or a graphite negative electrode or silicon-carbon negative electrode material. In some embodiments, the negative electrode active material can be metal lithium.

The present disclosure is further described in detail below through examples. The raw materials used in the examples are all commercially available.

Example 1

(1) Preparation of Non-Aqueous Electrolyte Solution:

26 parts by weight of vinyl carbonate (VC), 61 parts by weight of diethyl carbonate (DEC), 12 parts by weight of lithium hexafluorophosphate ($LiPF_6$), and 0.5 parts by weight of 2,3-pyridine dicarboxylic anhydride were mixed uniformly in an argon glove box to obtain a lithium-ion battery electrolyte solution C1 of this embodiment.

(2) Preparation of Lithium-Ion Battery:

A positive electrode active material ($LiNi_{0.5}Mn_{1.5}O_4$), acetylene black, and polyvinylidene fluoride were mixed uniformly at a ratio of 90:5:5, and pressed on an aluminum foil to obtain a positive electrode. A lithium metal sheet was used as a negative electrode. A PE/PP composite membrane was used as an ion exchange membrane. A button cell S1 was prepared by based on a conventional method in the art by using the electrolyte solution C1 of this embodiment.

Example 2

An electrolyte solution and a button cell were prepared by performing the same steps as those in Example 1, except that: 0.5 parts by weight of 2,3-pyridine dicarboxylic anhydride in step (1) were replaced with 1 part by weight of 3,4-pyridine dicarboxylic anhydride, and a lithium-ion battery non-aqueous electrolyte solution C2 and a button cell S2 were prepared.

Example 3

A non-aqueous electrolyte solution and a button cell were prepared by performing the same steps as those in Example 1, except that: 0.5 parts by weight of 2,3-pyridine dicarboxylic anhydride in step (1) were replaced with 3 parts by weight of 2,3-pyrazine dicarboxylic anhydride, and a lithium-ion battery non-aqueous electrolyte solution C3 and a button cell S3 were prepared.

Example 4

A non-aqueous electrolyte solution and a button cell were prepared by performing the same steps as those in Example 1, except that: 0.5 parts by weight of 2,3-pyridine dicarboxylic anhydride in step (1) were replaced with 5 parts by weight of 4,5-pyridazine dicarboxylic anhydride, and a lithium-ion battery non-aqueous electrolyte solution C4 and a button cell S4 were prepared.

Example 5

A non-aqueous electrolyte solution and a button cell were prepared by performing the same steps as those in Example 1, except that: 0.5 parts by weight of 2,3-pyridine dicarboxylic anhydride in step (1) were replaced with 0.05 parts by weight of 2,3-pyridine dicarboxylic anhydride, and a lithium-ion battery non-aqueous electrolyte solution C5 and a button cell S5 were prepared.

Example 6

A non-aqueous electrolyte solution and a button cell were prepared by performing the same steps as those in Example 1, except that: 0.5 parts by weight of 2,3-pyridine dicarboxylic anhydride in step (1) were replaced with 0.1 parts by weight of 2,3-pyridine dicarboxylic anhydride, and a lithium-ion battery non-aqueous electrolyte solution C6 and a button cell S6 were prepared.

Example 7

A non-aqueous electrolyte solution and a button cell were prepared by performing the same steps as those in Example 1, except that: 12 parts by weight of 2,3-pyridine dicarboxylic anhydride were added in step (1), and a lithium-ion battery electrolyte solution C7 and a button cell S7 were prepared.

Comparative Example 1

An electrolyte solution and a button cell were prepared by performing the same steps as those in Example 1, except that: 2,3-pyridine dicarboxylic anhydride was not used in step (1), and a lithium-ion battery non-aqueous electrolyte solution DC1 and a button cell DS1 were prepared.

Comparative Example 2

A non-aqueous electrolyte solution and a button cell were prepared by performing the same steps as those in Example 1, except that:

2,3-pyridine dicarboxylic anhydride in step (1) was replaced with maleic anhydride, and a lithium-ion battery electrolyte solution DC2 and a button cell DS2 were prepared.

Comparative Example 3

An electrolyte solution and a button cell were prepared by performing the same steps as those in Example 1, except that: 2,3-pyridine dicarboxylic anhydride in step (1) was replaced with pyridine, and a lithium-ion battery electrolyte solution DC3 and a button cell DS3 were prepared.

Comparative Example 4

An electrolyte solution and a button cell were prepared by performing the same steps as those in Example 1, except that: 2,3-pyridine dicarboxylic anhydride in step (1) was replaced with pyrazine, and a lithium-ion battery electrolyte solution DC4 and a button cell DS4 were prepared.

Comparative Example 5

An electrolyte solution and a button cell were prepared by performing the same steps as those in Example 1, except that: 2,3-pyridine dicarboxylic anhydride in step (1) was replaced with pyridazine, and a lithium-ion battery electrolyte solution DC5 and a button cell DS5 were prepared.

Test Embodiment (1) Oxidative Decomposition Potential Test

A three-electrode test method was used. Cells was prepared respectively using a platinum sheet as the working electrode, a lithium sheet as the reference electrode, and C1-C7 prepared in the examples and DC1-DC5 prepared in the comparative examples as the electrolyte solution. The polymerization potential of the additive and the oxidative decomposition potential of the electrolyte solution were characterized. The test results are shown in Table 1.

(2) Battery Charging and Discharging Performance Test

The button cells S1-S7 and DS1-DS5 under test were charged to 4.95 V at a constant current of 0.1 mA at normal temperature, and then discharged to 2.8 Vat a constant current of 0.1 mA. The discharge capacities and charge capacities of the cells were recorded. The charging and discharging efficiency was calculated based on the following equation: charging and discharging efficiency (%)=charge capacity/discharge capacity×100%. The test results are shown in Table 2.

(3) Battery Cycle Test

The above cells were charged to 4.95 V at a 1C-rate constant current (about 0.5 mA) and constant voltage at room temperature. The charging cut-off current was 0.05 mA. The cells were then discharged to 2.8 Vat a constant current of 0.5 mA. As such, one cycle is complete. The initial charge capacity and the initial discharge capacity were recorded, and the discharging efficiency (%) was calculated. After 100 cycles of repeated charging and discharging, the discharge capacity of the 100th cycle was recorded, and the capacity retention rate after cycles was calculated based on the following equation: capacity retention rate (%)=discharge capacity of the 100th cycle/initial discharge capacity×100%. The cut-off voltage was 4.95 V. The test results are shown in Table 3.

TABLE 1

| Electrolyte solution | Polymerization potential of additive | Oxidative decomposition potential of electrolyte solution |
|---|---|---|
| C1 | 4.1 | 5.8 |
| C2 | 4.1 | 5.6 |
| C3 | 4.2 | 5.7 |
| C4 | 4.1 | 5.3 |
| C5 | 4.1 | 5.2 |
| C6 | 4.1 | 5.7 |
| C7 | 4.1 | 5.6 |
| DC1 | \ | 4.8 |
| DC2 | 4.0 | 4.9 |
| DC3 | 4.1 | 4.9 |
| DC4 | 4.2 | 5.0 |
| DC5 | 4.1 | 5.1 |

TABLE 2

| Battery number | Discharge capacity/mAh · $g^{-1}$ | Charge capacity/mAh · $g^{-1}$ | Discharge efficiency/% |
|---|---|---|---|
| S1 | 133 | 148 | 89.8 |
| S2 | 125 | 150 | 83.2 |
| S3 | 123 | 147 | 83.6 |
| S4 | 128 | 143 | 89.5 |
| S5 | 125 | 166 | 75.3 |
| S6 | 101 | 135 | 74.8 |
| S7 | 120 | 175 | 70.9 |
| DS1 | 105 | 148 | 68.5 |
| DS2 | 103 | 182 | 56.5 |
| DS3 | 98 | 175 | 56.0 |

TABLE 2-continued

| Battery number | Discharge capacity/mAh · $g^{-1}$ | Charge capacity/mAh · $g^{-1}$ | Discharge efficiency/% |
|---|---|---|---|
| DS4 | 104 | 178 | 58.4 |
| DS5 | 92 | 189 | 48.7 |

TABLE 3

| Battery number | First discharge efficiency/% | Capacity retention rate after 100 cycles/% | Capacity retention rate after 200 cycles/% | Capacity retention rate after 300 cycles/% |
|---|---|---|---|---|
| S1 | 89.8 | 85.2 | 82.3 | 78.4 |
| S2 | 83.2 | 81 | 78 | 75.2 |
| S3 | 83.6 | 80.1 | 77.3 | 74.6 |
| S4 | 89.5 | 83.4 | 80.2 | 75.4 |
| S5 | 75.3 | 73.3 | 65.4 | 57.5 |
| S6 | 74.8 | 69.2 | 61.8 | 55.3 |
| S7 | 68.5 | 76.5 | 69.4 | 56.3 |
| DS1 | 70.9 | 61.2 | 53.3 | 42.4 |
| DS2 | 56.5 | 45.9 | 37.2 | 31.8 |
| DS3 | 56.0 | 44.3 | 38.2 | 30.1 |
| DS4 | 58.4 | 49.5 | 40.8 | 36.2 |
| DS5 | 48.7 | 37.5 | 33.9 | 29.5 |

It can be seen from the data in Tables 1 to 3 that the present disclosure effectively inhibits the decomposition of the electrolyte solution by adding the pyridyl dicarboxylic anhydride additive to the lithium ion electrolyte solution, thereby improving the high-temperature stability of the lithium-ion battery and prolonging the service life of the battery.

The embodiments of the present disclosure are described in detail above, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above embodiments may be combined in any suitable manner without contradiction. To avoid unnecessary repetition, various possible combinations are not further described in the present disclosure.

In addition, different implementations of this disclosure may also be arbitrarily combined without departing from the idea of this disclosure, and these combinations shall still be regarded as content disclosed in this disclosure.

What is claimed is:

1. An electrolyte solution for a lithium-ion battery, wherein the electrolyte solution for a lithium-ion battery comprises an organic solvent, a lithium salt, and an additive; and the additive comprises a first additive represented by formula (1):

formula (1)

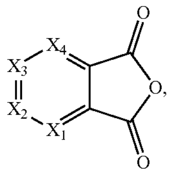

wherein in the formula (1), $X_1$, $X_2$, $X_3$ and $X_4$ are each independently selected from CR or N, and at least one of $X_1$, $X_2$, $X_3$ or $X_4$ is N; and R in $X_1$, $X_2$, $X_3$ and $X_4$ are each independently selected from H, halogen, $C_1$-$C_4$ alkyl, $C_1$-$C_4$ substituted alkyl, $C_4$-$C_7$ cycloalkyl, or $C_1$-$C_3$ alkoxy, and wherein the additive further comprises a second additive, and the second additive comprises vinyl carbonate.

2. The electrolyte solution according to claim 1, wherein R in $X_1$, $X_2$, $X_3$ and $X_4$ is H.

3. The electrolyte solution according to claim 1, wherein any one or two of R in $X_1$, $X_2$, $X_3$ and $X_4$ is N.

4. The electrolyte solution according to claim 1, wherein based on the total weight of the electrolyte solution, a content of the organic solvent is 50%-90% by weight, a content of the lithium salt is 1%-20% by weight, and a content of the additive is 0.1%-10% by weight.

5. The electrolyte solution according to claim 4, wherein, based on the total weight of the electrolyte solution, the content of the organic solvent is 60%-85% by weight, the content of the lithium salt is 5%-15% by weight, and the content of the additive is 0.5%-8% by weight.

6. The electrolyte solution according to claim 1, wherein in the additive, based on the total weight of the additive, a content of the first additive is 30%-100% by weight.

7. The electrolyte solution according to claim 6, wherein in the additive, based on the total weight of the additive, the content of the first additive is 50%-100% by weight.

8. The electrolyte solution according to claim 6, wherein the second additive further comprises one or more of lithium boroxalate, or lithium difluorosulfonimide.

9. The electrolyte solution according to claim 1, wherein the first additive is 2,3-pyridine dicarboxylic anhydride, 3,4-pyridine dicarboxylic anhydride, 2,3-pyrazine dicarboxylic anhydride, or 4,5-pyridazine dicarboxylic anhydride.

10. The electrolyte solution according to claim 1, wherein the organic solvent is one or more of ethyl methyl carbonate, dimethyl carbonate, diethyl carbonate, ethylene carbonate, propylene carbonate, butylene carbonate, ethylene sulfite, propylene sulfite, diethyl sulfite, γ-butyrolactone, dimethyl sulfoxide, ethyl acetate, or methyl acetate.

11. The electrolyte solution according to claim 1, wherein the lithium salt is one or more of $LiPF_6$, $LiBF_4$, $LiClO_4$, $LiAsF_6$, Li $CF_3SO_3$, $LiN(CF_3SO_2)_2$, $LiN(C_2F_5SO_2)_2$, LiC $(CF_3SO_2)_3$, or $LiB(C_2O_4)_2$.

12. A lithium-ion battery, comprising the electrolyte solution according to claim 1.

* * * * *